UNITED STATES PATENT OFFICE.

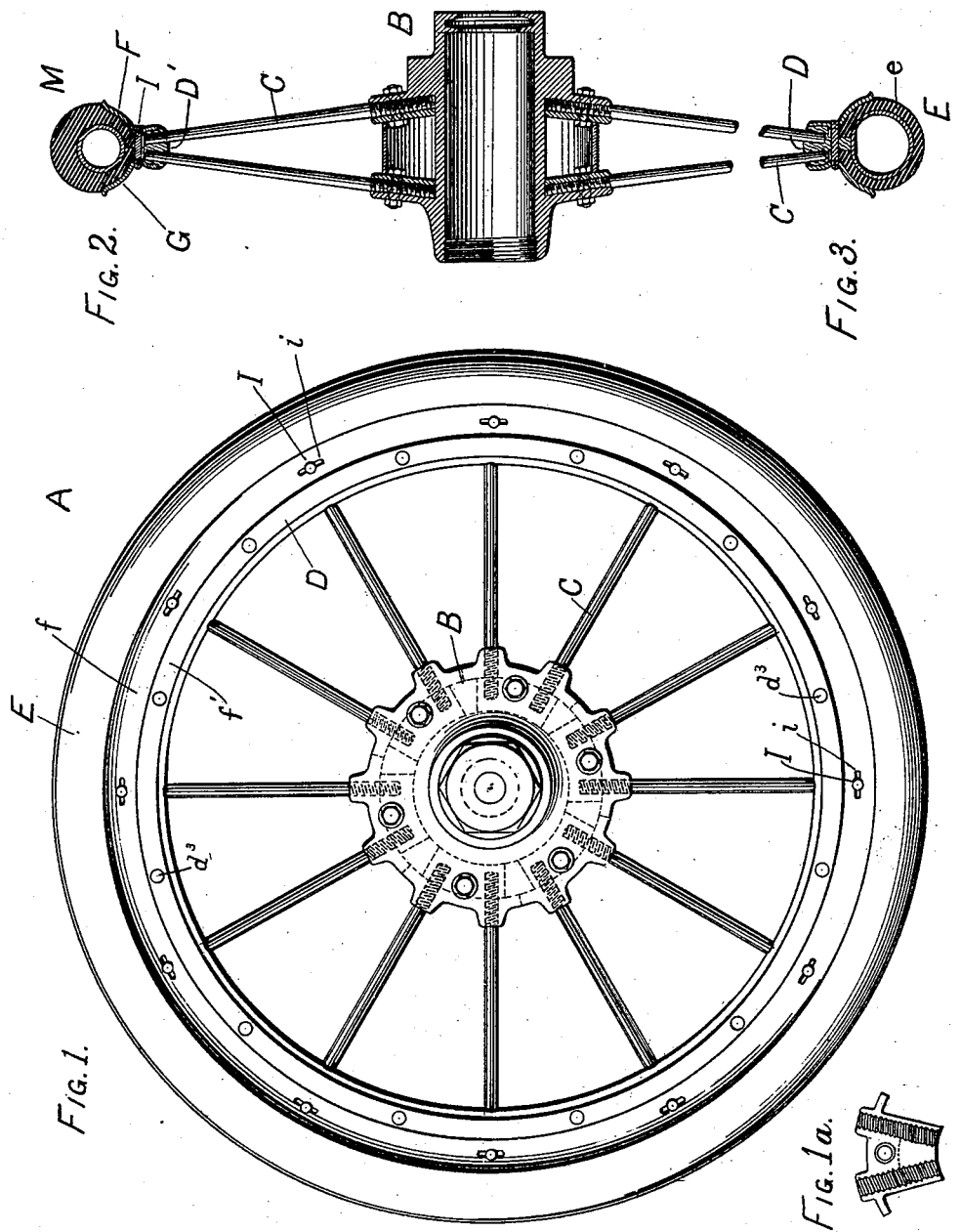

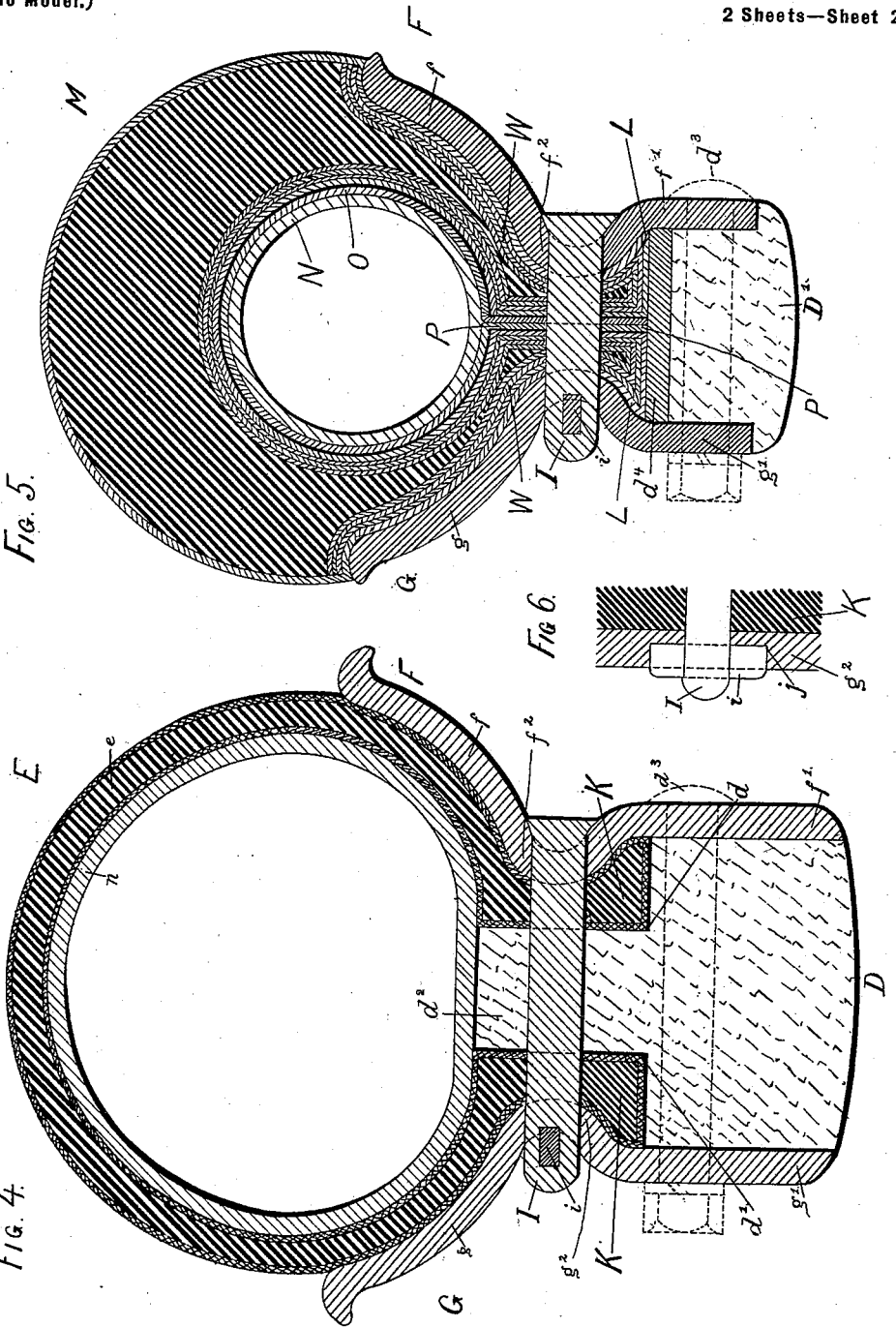

CHARLES HOWELLS, OF NEW YORK, N. Y.

VEHICLE-WHEEL AND TIRE.

SPECIFICATION forming part of Letters Patent No. 691,467, dated January 21, 1902.

Application filed May 19, 1899. Serial No. 717,394. (No model.)

*To all whom it may concern:*

Be it known that I, CHARLES HOWELLS, a citizen of the United States of America, and a resident of the city of New York, county of New York, and State of New York, have invented certain new and useful Improvements in Vehicle-Wheels and Tires, of which the following is a specification.

My invention relates to improvements in wheel-tires of the pneumatic type, and it also includes a rim and a wheel especially adapted thereto, the construction as a whole being particularly suited to the heavy service required by motor-vehicles—that is to say, vehicles of the motor or power driven type—which are necessarily of considerable weight and from which at times heavy strains are transmitted to the tires of their supporting-wheels, which it is the object of the present invention to meet.

The details of the construction of my improved wheel and tire are set forth in the following description, referred to in the appended claims, and illustrated in the accompanying drawings, in which—

Figure 1 is a view in elevation showing a wheel embodying the invention. Fig. 1$^a$ is a detail showing one of the spoke-supporting plates connected with the hub. Fig. 2 is a transverse sectional elevation of the wheel shown in Fig. 1, a portion of the lower part of said wheel being broken away. Fig. 3 is a fragmentary view relatively attached to Fig. 2, showing an alternative construction of the tire. Fig. 4 is an enlarged sectional view of the rim and tire. Fig. 5 is also an enlarged sectional view of the rim, but showing an alternative construction of tire more nearly approaching the cushion-tire type. Fig. 6 is a fragmentary detail illustrating one end of the key-bolt for fastening the tire to the rim.

In the drawings, Figs. 1 and 2, A indicates a wheel having a metallic hub B, spokes C, felly D, tire E, rim-flanges F G, locking-bolts $d^3$, key-bolts I, and keys $i$.

Fig. 3 shows a slightly-different construction provided to meet varying requirements, as when a large air-tube is used, and Fig. 1$^a$ shows a detail connected with the hub of the wheel.

Fig. 4 shows an enlarged view of the rim and tire of Fig. 3, and in this view D is a wooden felly which I prefer to use, but which is not essential. The felly D is formed with a deep recess $d\ d'$ on each side of its tread portion, between which is a tongue $d^2$. F and G are circular flange-plates, the inner portions of which, $g'\ f'$, correspond with and fit against the sides of the felly D and are securely attached thereto by bolts $d^3$, which pass through the said flanges and through the felly, constituting a secure and rigid attachment therefor. The upper portions $f\ g$ of the flanges F G extend upwardly and flare outwardly to form a rim for the tire of any cross-section, the principal supports of the flanges being the bolts $d^3$, by which the inner edges are secured to the felly D.

The form of tire shown in Figs. 3 and 4 is of the pneumatic type and comprises an inner tube $n$, of usual form, and an outer casing strengthened with fabric. The outer casing $e$ has, however, extra strong, thickened, and reinforced edges K K, which are seated in the recesses $d\ d'$ and against the tongue of the felly, where they are secured from the outside by the central inwardly-curved portions $f^2\ g^2$ of the flanges F G, which engage and securely hold them. These parts are connected by key-bolts I, which pass through the inwardly-contracted portions of the flanges, the thickened lower edges of the casing and the tongue $d^2$ of the felly being detachably secured in position by said bolts I and keys $i$. The keys $i$ pass through the outer ends of the key-bolts I and when in position enter the depressions $j$ formed in one of the flanges to receive them. An advantage resulting from the use of the keys $i$ instead of the usual screw-threaded nuts is that the expansion of the elastic material of the tire will keep them seated in the depressions $j$, so that they are not liable to jar loose and release their bolts. Furthermore, the flanges F G being securely held together by key-bolts, there will be much less strain upon the bolts $d^3$, by which they are secured to the felly. By slightly drawing the flanges G F together the keys $i$ will be lifted out of their seats and can be readily and much more rapidly removed than could screw-threaded nuts, more especially in view of the contracted position occupied by the keys. Ordinarily the flanges will possess sufficient elasticity to allow of their outer portions being sprung toward each other by any suitable tool; but in case they are made too stiff to permit of this a slight loosening of the bolts $d^3$ will allow them to be brought together, so as to release the keys.

In the alternative construction there is no change other than is needed to permit the use of a larger quantity of the rubber or other elastic material in the tread portion of the outer casing. When using a thicker outer casing, I prefer to strengthen the inner tube with fabric to enable it to withstand the air-pressure without transmitting to the casing any considerable strain.

In Fig. 5 is shown a modified construction which is desirable where a larger quantity of rubber is used in the outer casing. The side flanges F G are substantially the same as already described, as is also their independent attachment to the felly D' by bolts $d^3$. In this instance, as also in the case of Fig. 4, if desired, the felly may be reinforced by an iron band $d^4$. Where the iron band $d^4$ is employed, the tongue $d^2$ may be omitted, and where said tongue is omitted the meeting edges of the casing may be provided with additional layers of reinforcing fabric W, so that the bolts I, which pass through the contracted portions of the flanges F G and through the lower edges of the casing, however constructed, shall have a secure and durable hold upon said casing independent of the attachment of the flanges to the felly. Such bolts if properly applied will securely hold the casing and the inner tube under very heavy strain, the object and intention of the construction being to so strengthen and reinforce the casing, and particularly its lower edges, that it will have the strength and durability necessary to successful use and in which creeping is entirely prevented, the tire being held in position by the key-bolts I independent of the other bolts $d^3$, by which the rim-flanges are attached to the felly.

A particular feature of my invention consists in attaching the rim-flanges to the felly so that one or either of them can be detached therefrom or that they can be loosened therefrom and that then the secondary bolts I, which actually attach the casing thereto, can be removed. By attaching the rim-flanges separately to the felly by bolts $d^3$ they can be removed therefrom when desired either to replace a damaged flange or to secure access to the tire for the purpose of repair. The key-bolts by which the tire is secured to the rim being also detachable, the said tire may be removed by withdrawing the said key-bolts I and merely loosening the bolts $d^3$ holding the flanges F G. The two fastenings—the bolts $d^3$, which attach the flanges to the felly of the wheel, and the key-bolts I, which attach the tire to the rim—are therefore independent, and it will be obvious that the bolts may be so arranged that one half of them are passed through in one direction and one half in the opposite, so that by withdrawing half of the bolts and removing the nuts and keys from the other half one flange could be removed, leaving the other still attached to the wheel, which with a tire possessing the structural strength aimed at in the present instance is a very convenient and desirable arrangement.

In the form shown in Fig. 5, M is the outer casing, W designates the reinforced edges thereof, N is the inner tube, O is the exterior pressure-resisting fabric inclosing said inner tube, and P is a web formed of the extensions of the fabric O, which is carried down between the edges L L of the casing M, so that the key-bolts I shall pass through them all, and thereby effectually prevent creeping.

In view of the foregoing description various minor modifications may be made without departing from the invention.

Without limiting myself to the exact construction shown, what I desire to claim is—

1. The combination with a felly, of a tire comprising a casing having reinforced edges said edges flaring inwardly, plates adapted to the sides of said felly and detachable therefrom, said plates comprising the inner portion adjacent to the felly, a contracted medial or central portion and the outer portion flaring outwardly and adapted for the reception and support of the tire, bolts passing through said plates and the felly and means for securing said reinforced tire-casing edges.

2. In combination with a suitable rim, a tire comprising a casing having reinforced edges adapted to be secured to said rim by bolts passing transversely through the rim and the edges of the casing, and an inner air-tube within the casing having a reinforced covering of fabric and a web of the fabric extending between the edges of the casing.

3. In combination with a felly, laterally-detachable metallic side plates and bolts for securing them to the sides of the felly, said plates or flanges having contracted central portions and outwardly-flaring edges to sustain the tire and a tire-casing having reinforced edges adapted to fit between the contracted portions of the side flanges and to rest upon the felly and additional bolts passing through the contracted portions of the side flanges and the edges of the tire-casing.

4. In a wheel, the combination with a felly, of metallic side flanges bolted rigidly to said felly and formed with outwardly-flaring portions forming a seat for the tire, a tire having an outer casing formed with edges adapted to fit between the central portion of the flanges, an inner tube having a covering of fabric, the edges whereof are formed into a web extending therefrom and between the edges of the casing, and auxiliary bolts extending through the flanges, the edges of the casing and the web of the inner tube to hold them all in position.

5. The combination with a felly, of metallic flanges adapted to be secured one at each side thereof, said flanges being formed with centrally-contracted and laterally-extending outer portions, a tire having a casing formed with edges adapted to be secured between the central contracted portions of the flanges and to rest upon the felly, bolts for securing the lower portions of the flanges to the felly, and auxiliary bolts passing through the contracted portions of the flanges and the edges of the casing independent of the bolts connecting the flanges with the felly.

6. The combination with the felly of a wheel, of metallic flanges one on each side thereof, said flanges formed with their lower portions adapted to fit against the sides of the felly and having a contracted middle portion and outwardly-flaring outer portions, a tire having a casing formed with reinforced edges adapted to fit between the contracted middle portions of the flanges and to rest upon the felly, the wider portion of said tire being supported by the outwardly-extending flanges, bolts passing through the lower portions of the flanges and through the felly securely connecting the same, and auxiliary bolts passing through the contracted portions of the flanges and the edges of the casing between them.

Signed by me at New York, N. Y., this 17th day of May, 1899.

CHARLES HOWELLS.

Witnesses:
CARL WIGTEL,
CHRISTOPHER J. WESSELS.